April 22, 1969  O. K. RILEY  3,439,681
COOLING APPARATUS FOR DENTAL ANESTHETIZATION
Filed Oct. 31, 1966
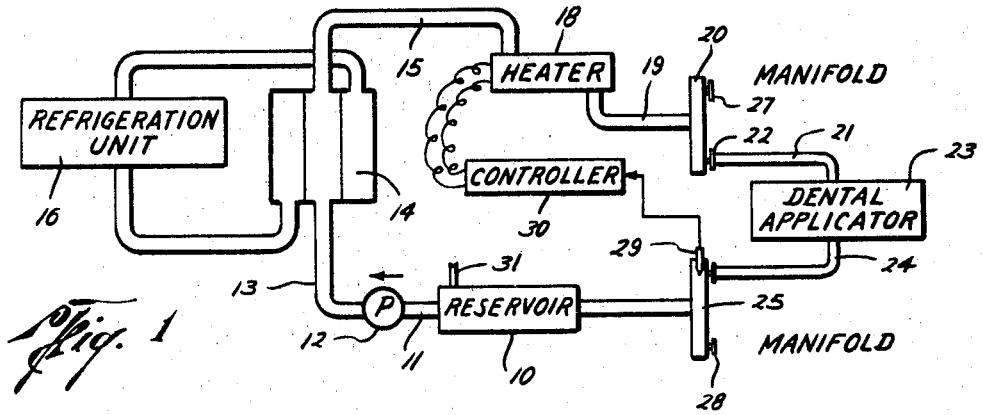
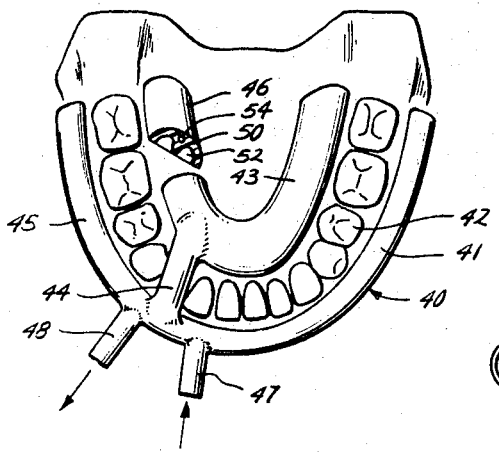
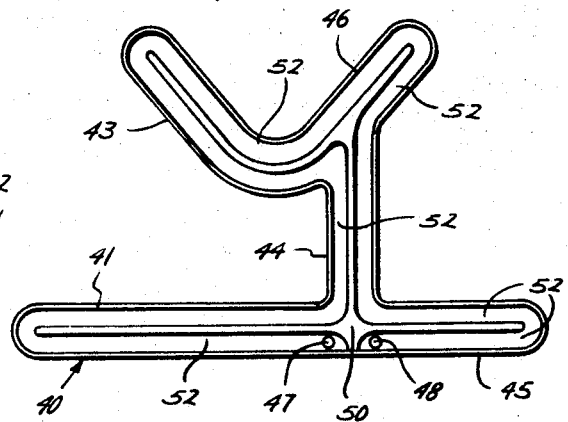
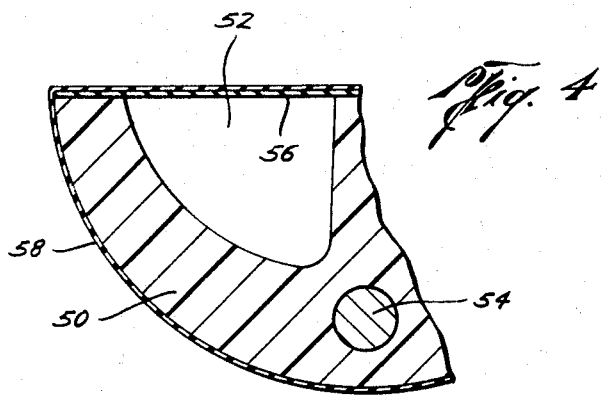
Orvel K. Riley
INVENTOR.
BY Arnold and Roylance
ATTORNEYS

United States Patent Office 3,439,681
Patented Apr. 22, 1969

3,439,681
COOLING APPARATUS FOR DENTAL
ANESTHETIZATION
Orvel K. Riley, Victoria, Tex., assignor to Surgical Eng.
and Research Corp., Victoria, Tex., a corporation of
Texas
Filed Oct. 31, 1966, Ser. No. 590,977
Int. Cl. A61f 7/12
U.S. Cl. 128—401       8 Claims The invention concerns methods and apparatus suitable for anesthetizing teeth and adjacent tissues by the application of cold.

Dental anesthetization to be practical must effect anesthesia rapidly, must do so with a minimum of pain, and must not harm the teeth or gingival tissues. Conventionally, local injections have been employed to effect anesthesia, even though many patients are anxious about injections, and injections ordinarily require a wait of several minutes before anesthesia is effected.

The invention provides methods and apparatus for dental anesthetization which can effect anesthesia rapidly, and which can reduce anxiety otherwise manifested by many patients. Apparatus and methods in accordance with the invention can be employed to induce anesthesia on routine fillings, periodontal curettage, gingivectomies, and tissue biopsies, as well as to control hemorrhage associated with extractions. Methods and apparatus in accordance with the invention may also be employed during crown and bridge restorations, extractions, and work on root canals.

Another advantage in accordance with the invention, in contrast with injection techniques, is that the anesthesia effected can be rapidly removed in a simple manner.

In one embodiment of the invention, a dental applicator is provided which is particularly useful in apparatus for anesthetizing teeth and adjacent tissues by the application of cold. The dental applicator comprises a crossover shaped to extend from a buccal gingival surface to a lingual gingival surface, preferably without contacting any teeth, and a pair of fingers extending from the crossover. The fingers are shaped to fit inside the mouth and against the gingival surfaces associated with a row of teeth in heat-transferring relationship for a distance of at least four teeth. One of the fingers fits against the buccal gingival surface and the other against the corresponding lingual gingival surface.

The dental applicator preferably has a fluid inlet and a fluid outlet connected to its buccal side, for example, to the buccal finger or the buccal end of the crossover, and each of the fingers and the crossover have at least one duct therein in fluid communication with the inlet and the outlet such that cold fluid entering the inlet can flow longitudinally of each of the fingers and return to the outlet in order to cool the applicator sufficiently to effect dental anesthetization. The applicator is made of materials sufficiently flexible to be conformable to both the buccal and lingual gingival surfaces in order to effect sufficient heat transfer between the applicator and the gingival surfaces for dental anesthetization.

The applicator is also constructed such that it is sufficiently rigid at anesthetization temperatures to retain its shape and remain conformed to the gingival surfaces in heat-transferring relationship after being conformed thereto. For example, the applicator may be made of a material which is flexible at ordinary mouth temperatures but which becomes rigid upon the application of cold. Alternatively, the applicator may include a support made of a suitable metal or other material which retains its shape after the applicator is conformed to the gingival surfaces. A support made of metal wire extending longitudinally of each finger and the crossover such that the metal support will cause the applicator to remain in a conformed shape after being bent to the desired position is a preferred embodiment.

The ducts are preferably disposed in the applicator to permit cold fluid to flow sufficiently close to the buccal and lingual gingival surfaces to provide sufficient heat transfer for dental anesthetization. The dental applicator is also preferably constructed such that the fingers are sufficiently long to anesthetize at least one quadrant of teeth and such that the fluid inlet and fluid outlet each connect to the buccal side of the applicator at a location proximate a side of the mouth to permit connection with external fluid lines without obstructing the view of the dentist.

The applicator may be employed by laying the flexible heat-transferring surfaces of the fingers against the buccal and lingual gingival surfaces associated with a row of teeth for a distance of at least four teeth, preferably at least one quadrant; conforming the heat-transferring surfaces to the gingival surfaces; and cooling the heat-transferring surfaces to a temperature sufficient for dental anesthetization by flowing cold fluid past the heat-transferring surfaces while the surfaces remain conformed to the gingival surfaces for a distance of at least four teeth.

To be practical, the dental applicator must anesthetize at least four teeth, preferably at least one quadrant of teeth, in one application. Otherwise, the technique requires too much time for general dentistry.

The heat-transferring surface applied to the gingival surfaces is preferably cooled to a temperature below 0° C. sufficient for dental anesthetization at a rate sufficient to minimize ischemia in the gingival tissues before cooling of the nerves located therein. Rapid cooling in this manner minimizes pain and discomfort of the patient. The surface is preferably cooled from ambient temperature to less than 0° C. in less than about 20 seconds to achieve this purpose. Temperatures of less than 0° C. down to about −7° C. have been found effective, although the exact preferred low temperature of course varies slightly depending on the patient. Temperatures less than 0° C. down to about −10° C. and lower may be within the operative range without harm to the tissues.

To minimize pain and discomfort of a patient the heat-transferring surface applied to the gingival surfaces is preferably made of a material other than metal, although metal may be employed in the applicator as long as it does not directly contact the gingival surfaces. Rubber and plastic, such as natural gum rubber, polyvinyl chloride, and the like, can be employed satisfactorily. One should also avoid contacting the teeth with the dental applicator when the applicator is cold in order to minimize pain and discomfort of the patient.

Refrigeration apparatus preferred for use with a dental applicator in accordance with the invention, as well as other embodiments of the dental applicator, are described below. The refrigeration apparatus, of course, preferably has suffiicent capacity to cool the dental applicator to a temperature less than 0° C. in less than about 20 seconds.

In the drawings:
FIG. 1 is a schematic drawing of apparatus in accordance with the invention suitable for anesthetizing teeth;
FIG. 2 is a schematic drawing of a dental applicator in accordance with the invention in anesthetizing position on a quadrant of teeth;
FIG. 3 is a schematic view showing the bottom interior of the dental applicator shown in FIG. 2 with heat-transferring surfaces removed; and
FIG. 4 is a fragmentary sectional view of the dental applicator shown in FIG. 3 taken along the line 4—4 with the heat-transferring surface in place.

Apparatus suitable for anesthetizing teeth in shown schematically in FIG. 1. As there shown, the reservoir 10 is connected to a pump 12 by a conduit 11, the pump 12 pumping fluid from the reservoir 10 through a conduit 13 to a heat exchanger 14. The heat exchanger 14 is associated with a refrigeration unit 16 to form a means for cooling fluid in the system. Cooled fluid travels from the heat exchanger 14 through a conduit 15 to a heater 18, and on to a manifold 20 through a conduit 19. A conduit 21 is connected to the manifold 20 through a suitable coupling 22, conduit 21 communicating with a dental applicator 23. Another conduit 24 communicates with the dental applicator 23 for returning fluid from the dental applicator 23 to a second manifold 25, which communicates by conduit 26 with reservoir 10, to form a continuous passageway for recirculation of the fluid. Manifolds 20 and 25 of course may be omitted from the system, or they may include other couplings, such as couplings 27 and 28, to permit more than one dental applicator to be connected to the refrigeration system. A fill tube 31 may for convenience be associated with the reservoir 10.

A temperature indicating device 29 is located in the manifold 25 to indicate the temperature of the fluid in the dental applicator 23, although the device could be located in the manifold 20, or other suitable location near the dental applicator, if desired. The temperature indicating device 29 may be, for example, a thermocouple, a thermistor, or the like. The temperature indication of the device 29 is connected with a controller 30 which controls the energy input to the heater 18 in response to the temperature indication. The heater 18 in turn controls the temperature of the fluid entering the dental applicator 23. The controller 30 can be conventional equipment; the heater 18 may include a conventional electrical resistance heater around which the fluid from conduit 15 flows to conduit 19, although any suitable heating means can suffice.

It has been found that the use of a heater to control the temperature of the fluid in the anesthetization system permits excellent control of the temperature of the fluid entering the dental applicator, and permits the system to effect a very rapid temperature decrease in the dental applicator to achieve dental anesthetization with a minimum of pain and discomfort of the patient. The fluid is preferably water with a suitable freezing point depressant, such as sodium chloride, methanol, ethylene glycol, and the like, although many other fluids may be used satisfactorily.

With reference to FIGS. 2, 3, and 4, a dental applicator 40 in accordance with the invention is shown in place along the buccal and gingival surfaces of a quadrant of teeth 42. The applicator 40 comprises a first member or finger 41 shaped to fit against the buccal gingival surface in the quadrant, a second member or finger 43 shaped to fit against the corresponding lingual gingival surface, and a crossover 44 connecting the members 41 and 43 approximately across the cuspid distal from the quadrant 42. Extending in opposite direction from the crossover 44 is a pair of members or fingers 45 and 46 which fit against the remaining buccal and lingual gingival surfaces of the opposite quadrant. A fluid inlet 47 and fluid outlet 48 is connected to the buccal side of the applicator 40 in location proximate the side of the mouth, i.e., a location near a cuspid. If desired, the fluid inlet can be located near one side of the mouth and the fluid outlet can be located near the other side. A dental clamp (not shown) may be disposed to help hold the dental applicator 40 in proper conformity with the buccal and lingual gingival surfaces, if desired.

The construction of the dental applicator 40 is better shown in FIGS. 3 and 4. As there shown, the applicator 40 comprises a rubber base 50 having embedded therein a metal wire 54 which helps maintain the applicator 40 in any shape to which it is bent. The base 50 has a channel or duct 52 extending from the fluid inlet 47 out to the end of the finger 41 and back to the crossover 44 where the duct 52 extends across the crossover 44 to the end of finger 43. From there, the duct 52 extends to the end of the finger 46, back to the crossover 44, across to the finger 45, out to the end of the finger 45, and back to the fluid outlet 48. Consequently, fluid entering the fluid inlet 47 can traverse the entire applicator 40 before flowing out the fluid outlet 48. The fluid inlet 47 and fluid outlet 48 may be connected to the conduits 21 and 24, respectively, which are shown in FIG. 1.

The base 50 with the duct 52 located therein and the wire 54 embedded therein may be made by curing rubber in a mold with the wire 54 suitably located therein. The wire 54 may comprise as desired a single support made of three wires welded together at the junctions between the crossover and the fingers, or it may comprise three unconnected wires, one the length of the crossover, one the length of the fingers 41 and 45, and one the length of the fingers 43 and 46. Other suitable support structures, of course, may be employed.

The fluid inlet 47 and fluid outlet 48 may be molded in place along with the base 50, or may be formed and connected to the base 50, after the base 50 is molded, by any suitable technique.

After the base 50 is molded, the applicator can be completed by vulcanizing or otherwise bonding a sheet 56 of pure gum rubber to the prominent surfaces of the base 50 on each side of the duct 52. After this step, the applicator 40 is preferably completed by curing a layer 58 of pure gum rubber over all of the exposed surfaces.

A dental applicator in accordance with the invention may take the form of many other specific embodiments, and the description and drawings herein are only illustrative of the invention, and should not be construed to limit the scope of the invention unnecessarily.

For example, the dental applicator may include a plurality of ducts associated with the fluid inlet and fluid outlet to accomplish the intended purpose, rather than one continuous duct. Further, the crossover may be located at positions other than near a cuspid, if desired, including behind the most posterior tooth in a row of teeth, although an applicator having a crossover near a cuspid is a preferred embodiment. Of course, the location and route of the duct or ducts may have to be varied depending on the location of the crossover. One could also use two or more crossovers, if desired, for example, one behind the most posterior tooth in a quadrant and the other behind the most posterior tooth in the opposite quadrant.

To anesthetize only one quadrant conveniently, the applicator 40 can be modified by blocking off or eliminating the portion of the duct 52 in the fingers 45 and 46 such that the duct extends from the fluid inlet 47 to the end of the finger 41, back to the crossover 44, on to the end of the finger 43, and then directly back to the crossover 44 and across the crossover 44 directly to the fluid outlet 48. The duct can be conveniently shaped in this manner during molding of the base.

What is claimed is:

1. In apparatus for anesthetizing teeth and adjacent tissues by the application of cold; a dental applicator comprising a pair of fingers extending from a crossover, one of said fingers being shaped to fit inside the mouth and against the buccal gingival surface associated with a row of teeth in heat-transferring relationship for a distance of at least four teeth, the other of said fingers being shaped to fit against the corresponding lingual gingival surface in heat-transferring relationship, said crossover being shaped to cross over the row of teeth; said applicator having a fluid inlet and fluid outlet connected to its buccal side, and said fingers and said crossover having at least one duct in fluid communication therewith such that fluid entering said fluid inlet can flow longitudinally of each of said fingers and return to said outlet; said applicator being sufficiently flexible to be conformable to both said buccal and lingual gingival surfaces for at least said distance, thereby to permit sufficient heat transfer between said applicator and said gingival surfaces for dental anesthetization; and said applicator being sufficiently rigid at anesthetization temperatures to retain its shape and remain conformed to said gingival surfaces in heat-transferring relationship after being conformed thereto.

2. The dental applicator defined in claim 1, wherein each of said fingers includes a duct for conducting cold fluid to the end of each of said fingers, and then back in each of said fingers to a place at least near said crossover.

3. The applicator defined in claim 2, wherein said fingers are long enough to anesthetize at least one quadrant of teeth and to permit said crossover to cross over said row of teeth near a cuspid distal from said quadrant.

4. The dental applicator defined in claim 1, wherein said applicator has a duct communicating with said inlet which extends to the end of one of said fingers and returns in this finger to said crossover where it extends over to the other of said fingers and then extends out to the end of this other finger and returns in this other finger to communication with said outlet.

5. The dental applicator defined in claim 1, wherein said applicator comprises non-metallic material surrounding at least one flexible metallic support extending longitudinally of each of said fingers and longitudinally of said crossover.

6. The dental applicator defined in claim 1, wherein said applicator comprises a second pair of fingers extending from said crossover in opposite direction from the first pair of fingers, whereby said second pair of fingers fit against buccal and lingual gingival surfaces associated with teeth in the side of the mouth opposite the side in which the first pair of fingers fit.

7. The dental applicator defined in claim 6, wherein said second pair of fingers has at least one duct therein communicating with said fluid inlet and fluid outlet.

8. In apparatus for anesthetizing teeth and adjacent tissues by the application of cold; a dental applicator comprising a first flexible elongated member shaped to fit inside the mouth and against the buccal gingival surface of a row of teeth in heat-transferring relationship for a distance of at least one quadrant of teeth, and a second flexible elongated member shaped to fit inside the mouth and against the ligual gingival surface of a row of teeth in heat-transferring relationship for a corresponding distance; each of said first member and said second member having at least one duct therein extending longitudinally thereof substantially for a distance of at least one quadrant of teeth; at least one crossover connecting said first member with said second member and including at least one duct therein which communicates with a duct in each of said first member and said second member; a fluid inlet connected to said first member at a position proximate one side of the mouth when the first member is disposed therein, and communicating with a duct in the first member; and a fluid outlet connected to said first member at a position proximate one side of the mouth when the first member is disposed therein, and communicating with a duct in the first member; whereby cold fluid entering said fluid inlet and leaving said fluid outlet can flow through said first member, said second member, and said crossover sufficiently to effect dental anesthetization of at least one quadrant of teeth.

References Cited

UNITED STATES PATENTS

| 2,167,467 | 7/1939 | Sisson | 128—402 |
| 2,429,238 | 10/1947 | Restarski et al. | 128—400 |

L. W. TRAPP, *Primary Examiner.*

U.S. Cl. X.R.

128—402